United States Patent [19]
Johnson et al.

[11] 3,812,391
[45] May 21, 1974

[54] WHEEL SPEED SENSOR

[75] Inventors: James D. Johnson, Dearborn; Alan T. Maytum, Sterling Heights, both of Mich.

[73] Assignee: Rockwell International Corporation, Pittsburgh, Pa.

[22] Filed: June 16, 1972

[21] Appl. No.: 263,688

[52] U.S. Cl. ............................................. 310/168
[51] Int. Cl. .......................................... H02k 19/24
[58] Field of Search ............ 310/168, 169, 155, 67, 310/74

[56] References Cited
UNITED STATES PATENTS

| | | | |
|---|---|---|---|
| 3,683,219 | 8/1972 | Kruse | 310/168 |
| 3,487,247 | 12/1969 | Scheffler | 310/168 |
| 3,489,935 | 1/1970 | Hayes | 310/67 |

*Primary Examiner*—D. F. Duggan

[57] ABSTRACT

A wheel speed sensor mechanism including a magnetic sensor stationarily mounted on a vehicle axle, a rotor drive means for rotating the rotor with the wheel, and common mounting and support means carried by the vehicle axle for supporting the rotor and sensor in a predetermined relation.

10 Claims, 4 Drawing Figures

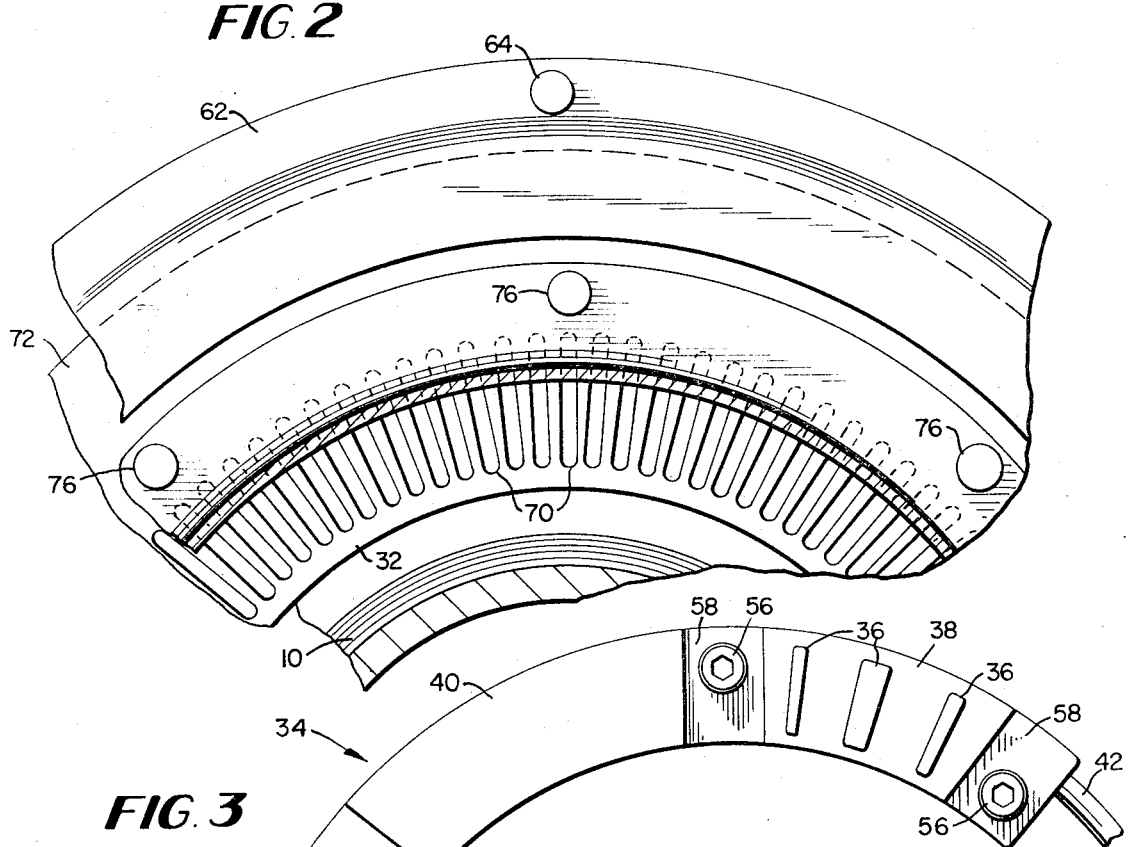
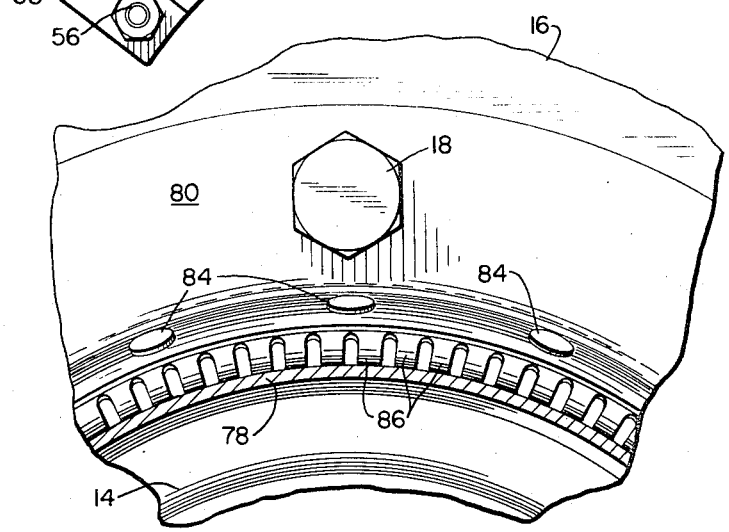

3,812,391

WHEEL SPEED SENSOR

BACKGROUND OF THE INVENTION

Modern anti-skid control systems operate in response to electrical signals indicative of the angular velocity or acceleration of one or more of the vehicle wheels. Usually these signals are derived from an electromagnetic sensor including a magnet carried by a stationary portion of the vehicle such as an axle housing and a toothed or notched metal ring which rotates with the wheel opposite the magnet. As the ring teeth pass the magnetic sensor device the resulting variations in flux produce an electric signal, the frequency of which is a function of the angular velocity of the vehicle wheel.

To produce the required accuracy of the velocity signal the sensor and ring must be precisely located with respect to each other and must remain in a preselected relationship even after extended operation in which the sensor components are subjected to road shocks and constant vibration.

It is also essential that installation of the sensor mechanism be accomplished in the manner adaptable to mass production methods to minimize the need for skilled technicians and elaborate installation techniques. This requires that the sensor components be automatically aligned in their predetermined relationship as the wheel is quickly and easily installed initially and reinstalled after repair on the vehicle axle. In addition, during operation the velocity sensing unit must be protected against dirt, mechanical damage and heat.

Prior wheel speed sensor mechanisms which have generally included a magnetic sensing unit stationarily mounted on the axle and a rotor mounted on the wheel have presented difficulties in aligning the sensor assembly and rotor to a predetermined relationship as the wheel is mounted on the axle. It has been especially difficult to accurately align the sensor components concentrically about the axis of the axle with a predetermined axial clearance between the rotor and the stationary magnet assembly. These difficulties result not only from human error, but also from variations and inaccuracies in the vehicle wheel components, such as the axle, bearings, wheel hub, etc., all of which may cause improper alignment of the sensor components, therefore resulting in an inaccurate velocity signal.

SUMMARY OF THE INVENTION

Accordingly, the primary object of this invention resides in the provision of a novel, unitized vehicle wheel speed sensor mechanism in which the rotating and stationary components of the mechanism are both mounted on the axle in predetermined precise relationship, with the rotating component then being driven from the wheel when it is mounted on the axle.

Another object of the invention resides in the provision of a novel, unitized wheel sensor mechanism in which both the stationary and rotating components are mounted on the axle in predetermined relationship in such a manner that concentricity between the stationary and rotating components is obtained without the need of special and expensive mounting equipment previously required.

Still another object of the invention resides in the provision of a novel, unitized wheel speed sensor mechanism in which the stationary and rotating sensor components are both mounted on the axle with a predetermined axial clearance gap between them. The gap is maintained and controlled by the construction of the components themselves and their mounting assembly and the predetermined relationship is essentially unaffected by installation of the wheel on the axle. Consequently, the wheel may be rapidly installed initially on the axle and reinstalled after repair by unskilled techicians employing routine installation techniques.

The novel wheel speed sensing mechanism of the invention, which attains these and other objects, includes an arcuate shaped magnetic sensing assembly stationarily mounted on the axle and a rotor or ring member rotatably mounted on the axle in predetermined relationship with the sensing assembly. The mounting assembly for the components maintains a predetermined axial clearance gap between the ring member and magnetic sensing assembly and concentricity of the components within the required limit to ensure that an accurate velocity signal is produced, and the mounting assembly permits a limited amount of radial adjustment of the ring member without adversely affecting the velocity signal. A drive member is connected to the wheel and drivingly engages the ring member upon installation of the wheel on the axle. Because all of the sensor components are accurately produced to close tolerances by the manufacturer to obtain and maintain a precise predetermined relation between the rotating and stationary parts, continuous accurate operation of the sensor mechanism is assured and is unaffected by installation and reinstallation of the wheel on the axle or by road shocks and vibration produced during movement of the vehicle.

Other objects and advantages of the invention will become apparent as it is described with reference to the accompanying drawings wherein like numerals indicate like elements.

BRIEF DESCRIPTION OF THE DRAWINGS

FIG. 2 is a fragmentary section taken generally along line 2—2 of FIG. 1 illustrating the construction of the rotor;

FIG. 3 is a fragmentary section taken generally along line 3—3 of FIG. 1 illustrating the stationary magnetic sensing assembly;

FIG. 4 is a fragmentary section taken generally along line 4—4 of FIG. 1 illustrating one form of drive unit for rotating the rotor with the wheel.

DETAILED DESCRIPTION OF THE INVENTION

Figure 1:
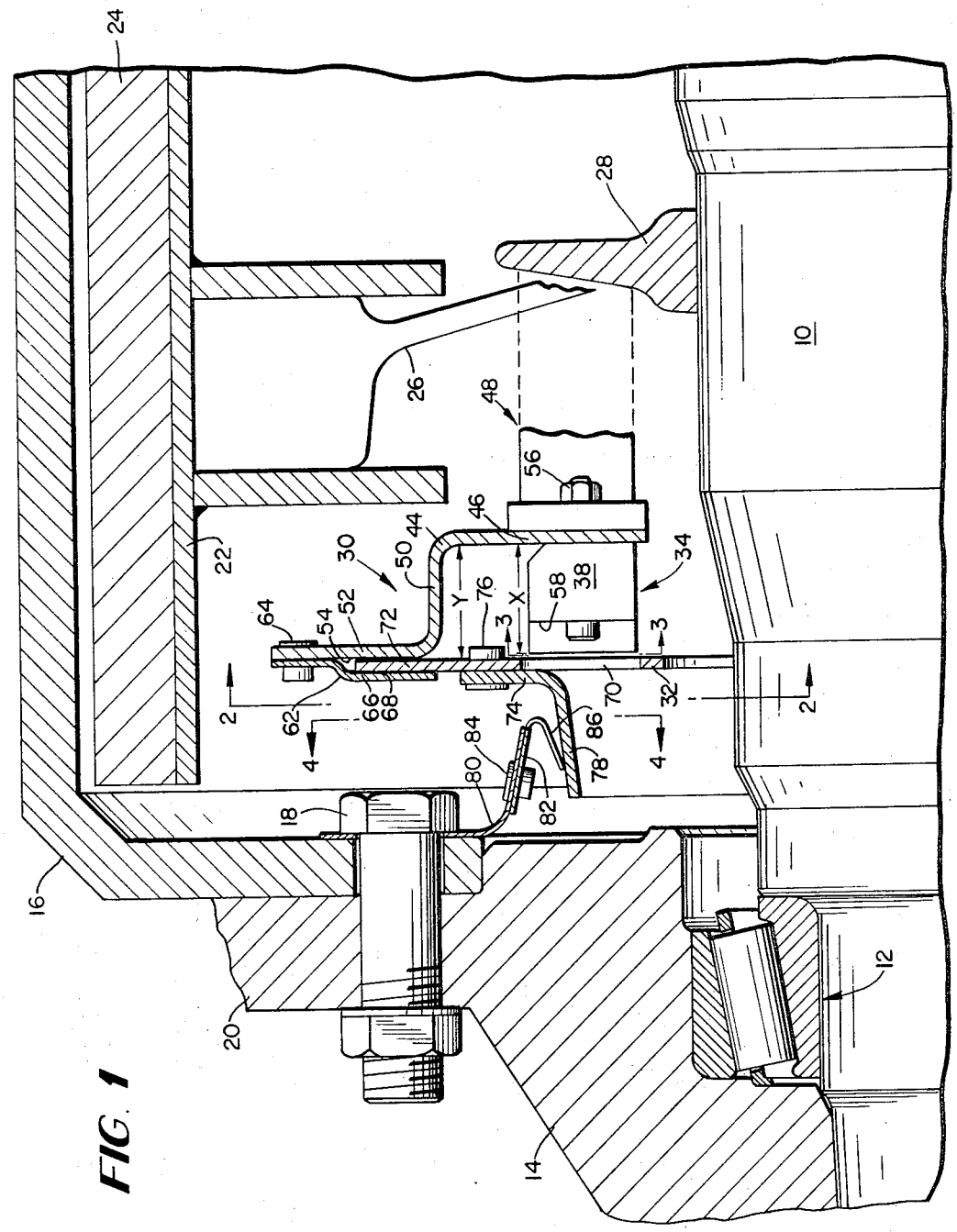
FIG. 1 is a fragmentary section showing the novel, unitized wheel sensor mechanism constructed in accordance with the present invention.

For present purposes the invention will be disclosed as applied by a non-steerable axle such as a trailer axle designed for heavy use. As used throughout the specification and claims the term "axle" is intended to refer to any stationary component on which a wheel hub is mounted and includes components commonly referred to as spindles or hollow tubular housings which accommodate drive shafts if the wheels are to be driven.

Referring now to FIG. 1, axle 10 is provided at its outer end with a bearing seat for bearing assembly 12 upon which wheel hub 14 is rotatably supported. Brake drum 16 is connected by a plurality of bolts 18 to a radial flange 20 of hub 14, with flange 20 also carrying a plurality of wheel mounting studs not shown. The brake assembly is conventional and includes brake shoes 22 carrying linings 24 and a brake operating mechanism including an actuating arm schematically shown at 26 and connected to a spider having a radial flange section 28 secured on axle 10.

The wheel speed sensor mechanism 30 includes two essential components, a rotor component formed by a steel ring 32 and a stationary sensor unit 34.

As shown in FIGS. 1 and 3, sensor unit 34 is of arcuate configuration and is formed on a radius extending about the axis of axle 10 and in a typical case may have a radial width of 0.970 inches. The magnetic sensing assembly may be of any conventional construction and typically has three poles 36 embedded in a plastic body portion 38 and a second housing portion 40 containing electric components (not shown) which convert the signals generated by the magnets to proper form for use in the brake control system. The leads to the power supply for the sensor unit 34 as well as the output signal are contained in a cable 42 leading into one end of the assembly.

As shown in FIG. 1, the unitized sensor mount includes an annular mounting bracket 44 having an inner radial section 46 secure to an adapter 48 carried by the spider 28, an intermediate section 50 extending axially in the outboard direction, and an outer radial flange section 52, which has a radial surface 54 located in a plane perpendicular to the axis of axle 10. The sensor unit 34 is secured to the inner radial flange 46 of the bracket 44 by screws 56, the heads of which are received in recesses 58 in the sensor. An annular retainer member 62 is fixed to flange 52 by a plurality of rivets 64 and includes a ring section 66 which has a radial face 68 axially spaced from and substantially parallel to the radial face 54 on flange 52.

Ring member 32 includes a plurality of surface discontinuities in the form of equally circumferentially spaced, radially extending slots 70 which are axially aligned opposite the outboard radial face of sensing assembly 34 and an outer peripheral portion 72 which is rotatably mounted between the opposed radial faces 54 and 68.

The respective components are constructed so that the axial distance from the outboard face of flange section 46 to the outboard radial faces of magnet poles 36 is less than the axial distance to radial face 54 by a predetermined amount which is equal to the predetermined desired axial clearance or gap between ring 32 and magnet poles 36. Ring 32 fits with close tolerances between radial faces 54 and 68 so that it rotates substantially flush with radial face 54 and has no significant axial play.

In a typical installation, the O.D. of ring member 32 will be approximately 11.750 inches and retainer 62 and its ring section 66 are constructed so that the annular space between radial faces 54 and 68 has a maximum diameter of approximately 12 inches. Thus, ring 32 is radially displaceable or adjustable through a distance of about 0.25 inches. To accommodate the radial displacement of ring 32, slots 70 will have a radial length greater than the radial width of poles 36 so that the velocity signal produced by assembly 34 will be unaffected by the limited radial displacement or adjustment permitted for ring 32. This particular construction and arrangement of the sensor components is highly advantageous, since it eliminates the need for exact concentricity between ring 32 and assembly 34 and therefore makes installation of the mechanism and the wheel much simpler while still assuring accuracy of the velocity signal.

An annular drive collar 74 is fixed to ring 32 by a plurality of rivets 76 and includes an inwardly tapered hub section 78 extending axially in the outboard direction of axle 10. The drive unit for rotating hub 78 and ring 32 includes an anular drive member 80 connected by bolts 18 to wheel hub 14 and a friction spring drive element 82 connected to member 80 by rivets 84. Spring member 82 includes a plurality of circumferentially spaced, resilient spring fingers 86 which frictionally engage hub section 78 with sufficient gripping force to rotate ring 32 with wheel hub 14. Alternate spring fingers are of different length and all the fingers are radially yieldable to facilitate assembly of the fingers on hub 78.

From the description hereinabove, it is apparent that the unitized sensor mechanism 30 advantageously provides a unit in which the stationary and rotating sensor components are initially assembled in a predetermined relationship and thereafter maintained in that relationship throughout an extended period of operation with the relationship being substantially unaffected by installation and/or reinstallation of the wheel on the axle. Because the sensor components are all produced and assembled in a unitary fashion by the manufacturer, the necessary predetermined relationship is assured.

After the sensor mechanism 30 is properly mounted on axle 10, wheel hub 14 may then be installed on the axle without affecting the predetermined relationship between the sensor components. This is facilitated by the resilient spring fingers 86 and by the fact that ring 32 is radially displaceable or adjustable between the radial faces 54 and 68 and exact concentricity is not critical. As a result, relatively unskilled personnel and routine techniques may be employed in mounting the wheel hub on the axle. The same is true during reinstallation of the wheel following repair or replacement.

Also, during operation of the vehicle, bracket 44, collar 74, and drive member 80 cooperate to shield sensing assembly 34 from dirt, mechanical damage, and heat and thereby ensure production of an accurate velocity signal.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A wheel speed sensor assembly adapted for use in association with a wheel rotatably mounted on a relatively stationary axle comprising annular rotor means adapted to extend around said axle, magnetic sensing means, means for mounting said magnetic sensing means and said rotor means on said axle with said rotor means being rotatable with respect to said magnetic sensing means, and means for drive connecting said rotor means with said wheel for rotation therewith, said rotor means including a ring member having a plurality of surface discontinuities which, upon rotation of said wheel, cause a signal to be produced by said magnetic sensing means indicative of the wheel speed, said mounting means comprising a support for stationarily supporting said magnetic sensing means on said axle, a bracket connected to said support and having a first annular radial surface located in a plane substantially perpendicular to the axis of said axle, a retainer member connected to said bracket and having a second annular radial surface spaced from and substantially parallel to said first radial surface, and said ring member having its outer peripheral portion rotatably mounted between said first and second surfaces.

2. The assembly defined in claim 1, wherein said surface discontinuities constitute a plurality of radially extending slots formed around said ring member.

3. The assembly defined in claim 1, wherein said ring member is radially movable between said first and second surfaces.

4. The assembly defined in claim 3, wherein said surface discontinuities in said ring member include a plurality of radially extending slots having a length greater than the radial thickness of the opposing poles of said magnetic sensing means.

5. The assembly defined in claim 1, said drive means including an annular collar member fixed to said ring member, a drive member rotating with said wheel, and means connecting said drive member with said collar member.

6. The assembly defined in claim 5, wherein said drive member is connected to said collar member by a plurality of resilient spring fingers.

7. The assembly defined in claim 1, said drive means including a collar member fixed to said ring member, a drive member rotating with said wheel, and means connecting said drive member to said collar member to rotate said ring member with said wheel.

8. The assembly defined in claim 7, wherein said drive member is connected to said collar member by a plurality of resilient spring fingers.

9. A wheel speed sensor adapted for use in association with a wheel rotatably mounted on an relatively stationary axle comprising a ring member having a plurality of surface discontinuities, magnetic sensing means, means for mounting said sensing means and said ring member on said axle with said ring member being rotatable about said axle with respect to said sensing means, said mounting means comprising a support for stationarily supporting said magnetic sensing means on said axle, a bracket connected to said support and having a first annular radial surface located in a plane substantially perpendicular to the axis of said axle, a retainer member connected to said bracket and having a second annular radial surface spaced from and substantially parallel to said first radial surface, said ring member being rotatably mounted and radially movable between said first and second surfaces, and means for drive connecting said ring member with said wheel, whereby upon rotation of said ring member said surface discontinuities cause a signal to be produced by said sensing means which is indicative of the wheel speed.

10. The assembly defined in claim 9, wherein said surface discontinuities include a plurality of radially extending slots formed around said ring member, said slots being rotatable past said sensing means to produce a signal indicative of the wheel speed.

* * * * *